United States Patent [19]

Bignell et al.

[11] Patent Number: 5,728,948
[45] Date of Patent: Mar. 17, 1998

[54] FLUID METER CONSTRUCTION

[75] Inventors: Noel Bignell, Annandale; Anthony Francis Collings, Turramurra; Kenneth James Hews-Taylor, West Pymble; Alan William Brew, St. Ives; Michael Ross Peterson, Ryde; Suszanne Thwaites, Lindfield, all of Australia

[73] Assignees: Commonwealth Scientific and Industrial Research Organisation, Campbell; AGL Consultancy Pty. Ltd., North Sydney, both of Australia

[21] Appl. No.: 513,922
[22] PCT Filed: Mar. 9, 1994
[86] PCT No.: PCT/AU94/00112
  § 371 Date: Jan. 10, 1996
  § 102(e) Date: Jan. 10, 1996
[87] PCT Pub. No.: WO94/20822
  PCT Pub. Date: Sep. 15, 1994

[30] Foreign Application Priority Data

Mar. 9, 1995 [AU] Australia .................. PL7725

[51] Int. Cl.$^6$ .................................................. G01F 1/66
[52] U.S. Cl. ................................ 73/861.28; 73/861.29
[58] Field of Search ..................... 73/861.27, 861.28, 73/861.29, 861.31

[56] References Cited

U.S. PATENT DOCUMENTS

| | | | |
|---|---|---|---|
| 2,480,646 | 8/1949 | Grabau | 73/861.27 |
| 3,729,993 | 5/1973 | Eck et al. | 73/861.27 X |
| 3,788,140 | 1/1974 | Turtle | 73/861.28 |
| 3,817,098 | 6/1974 | Brown | 73/861.28 |
| 3,964,309 | 6/1976 | Husse et al. | 73/861.28 |
| 4,365,518 | 12/1982 | Zacharias, Jr. | 73/861.28 X |
| 5,168,762 | 12/1992 | Gill | 73/861.28 |
| 5,243,863 | 9/1993 | Gill | 73/861.28 |
| 5,383,369 | 1/1995 | Khuri-Yakub et al. | 73/861.29 |
| 5,464,039 | 11/1995 | Bergamini | 73/861.29 X |

FOREIGN PATENT DOCUMENTS

| | | |
|---|---|---|
| 85200070 | 1/1985 | European Pat. Off. . |
| 90124417 | 12/1990 | European Pat. Off. . |
| 92203063 | 10/1992 | European Pat. Off. . |
| 2527286 | 6/1975 | Germany .................. 73/861.29 |
| 27 30 770 | 7/1977 | Germany . |
| PCT/NL85/00041 | 10/1985 | WIPO . |
| PCT/AU92/00314 | 6/1992 | WIPO . |
| WO93/05570 | 1/1993 | WIPO . |
| WO94/04890 | 3/1994 | WIPO . |

OTHER PUBLICATIONS

International Search Report mailed 6 Jul. 1994 (Jul. 06, 1994).

*Primary Examiner*—Elizabeth L. Dougherty

[57] ABSTRACT

A fluid meter has a central cylindrical section in which time-of-flight ultrasonic measurements can be made between acoustic transducers disposed in spaced apart enlarged end sections. The central section has a smaller diameter than do the end sections. Transitional regions join the end sections to the central cylindrical section. The transducers are located at least in part in the transitional regions. The transitional regions in the intermediate central section are generally shaped such that in combination with the shape and location of the transducers, pressure drops along the central section along with back-reflections of acoustic pulses from the transitional regions are reduced.

16 Claims, 15 Drawing Sheets

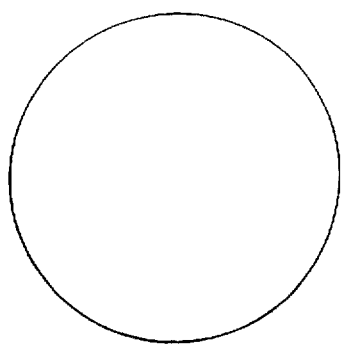
(0,1)
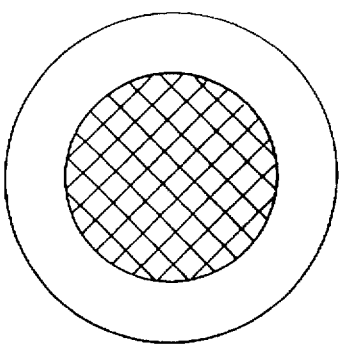
(0,2)
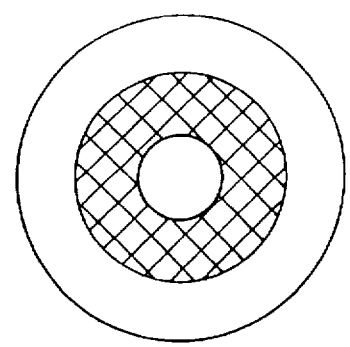
(0,3)
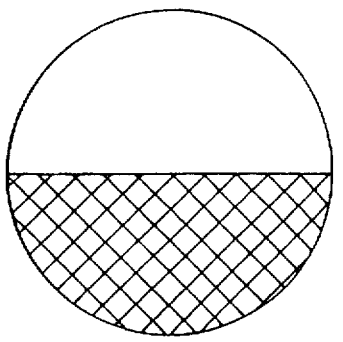
(1,1)
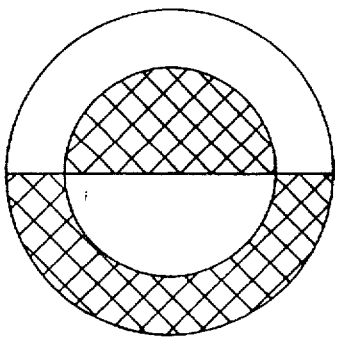
(1,2)
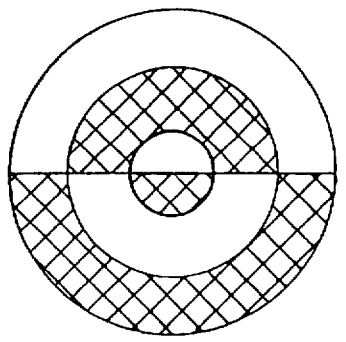
(1,3)
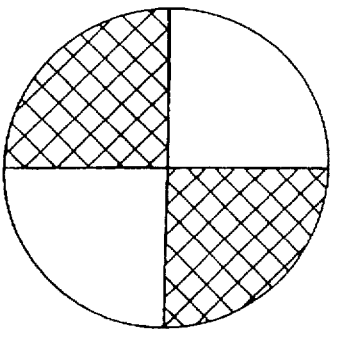
(2,1)
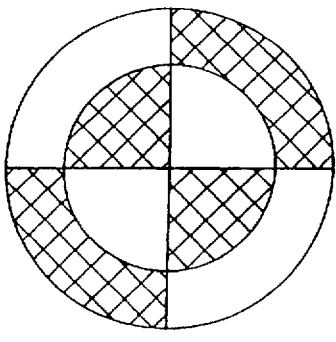
(2,2)
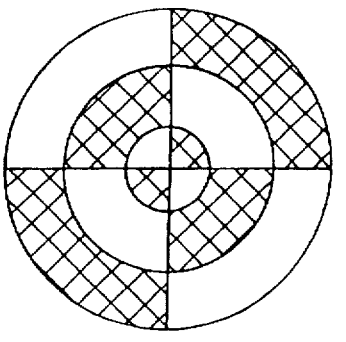
(2,3)
FIG. 6

Ch1 2.00V M 100µs A×2 1.00V

Ch1 200mV M 100µs A×2 1.00V

Ch1 200mV M 100µs A×2 1.00V

Ch1 200mV M 100µs A×2 1.00V 5,728,948

FLUID METER CONSTRUCTION

TECHNICAL FIELD

The present invention relates generally to the construction of electronic fluid flow meters and, in particular, to a housing for such a meter, a housing for a transducer, a system for insertion as a section in a fluid carrying pipe and a system for determining the velocity of a fluid within a pipe.

BACKGROUND ART

Occasions arise where it is necessary to determine the velocity of flow of a fluid within a pipe. This can be achieved by placing at least two transducers within the pipe and causing at least one of the transducers to transmit ultrasonic signals along or across the pipe for reception by the other transducer. Subject to variations in the time of flight of the ultrasonic signals between the transducers, the velocity of fluid flow can be determined.

Such methods invariably require variations in the cross-section of the pipe in the vicinity of the transducers giving rise to pressure variations at or about each transducer location. In some cases, the pressure drop about the transducer can be irrecoverable.

Furthermore, in order to determine this time of flight with small uncertainty, it is necessary to select some precise feature of the pulse which can serve as a timing marker. The crossing of the signal through zero is capable of very accurate location in time and makes a good timing marker. There are, however, a number of zero-crossings from which one such crossing must be reliably selected as the timing marker.

FIG. 1E shows a typical ultrasonic measurement arrangement 101 in which two transducers 102, 103 face each other through a duct 104 having a cylindrical shape and circular cross-section with gas flowing in the direction indicated by the arrow 106.

FIGS. 1A–1D show a signal typically received from a pulse of ultrasound launched into the circular duct 104. The received signal is initially shown in FIG. 1A and extends for some time shown in FIGS. 1B, 1C and 1D where markers indicate times, 2 times, 3 times and 4 times respectively past the initial arrival of the start of the signal.

A particular negative going zero-crossing has been chosen as the event on which to do the timing. International Patent Application No. PCT/AU92/00314 (WO93/00549) discloses an electronic fluid flow meter which incorporates circuitry developed which selects this particular crossing in a two-stage process. Using the signal amplitude, a time is chosen before the arrival of the required crossing at which a negative-going zero-crossing detector is enabled. There is a reasonable latitude allowable in the timing for this preliminary event but it is apparent that it must occur before the chosen zero-crossing but after the preceding one. Otherwise, it would be used instead for the precise timing marker.

Such an arrangement has been found to operate satisfactorily. However, as the arrangement is based on the amplitude of the signal and how it varies with time, anything which changes the amplitude of the signal has the potential to interfere with the choice of the initial time and thus in the selection of the correct zero-crossing. One cause of amplitude changes in electronic systems are gain changes. These can be due to aging, temperature, or other environmental effects. It is normal to compensate for such changes by some form of automatic gain control (AGC) which almost eliminates these amplitude changes. There are, however, other causes of amplitude change that affect the individual peak heights in the signal even when, as a result of the AGC, the maximum peak height is constant. Furthermore, when amplitude changes cause an incorrect choice of zero-crossing the timing error which results will be at least one whole period of the signal. This represents a serious error because it is systematic and averaging will not produce an unbiased mean of smaller uncertainty. A significant contributor to these amplitude changes is the existence and propagation of non-fundamental acoustic modes.

OBJECT OF THE INVENTION

It is an object of the present invention to substantially overcome, or ameliorate, one or more of the abovementioned problems through alteration of the fluid measuring pipe portion to provide for improved reliability in fluid flow measurement.

This object can be realised in various forms, and for example by:

a housing for a transducer, the housing being locatable within a fluid carrying pipe and adapted to minimise a fluid pressure drop thereabout;

a system for insertion as a section in a fluid carrying pipeline which is adapted to suppress the effects of non-fundamental acoustic modes; and a meter construction that permits determining the velocity of a fluid within a pipe.

DISCLOSURE OF THE INVENTION

Throughout this specification reference to "high-order acoustic modes" is to be taken as including a reference to non-fundamental acoustic modes, and vice versa.

In accordance with one aspect of the present invention there is disclosed a fluid meter comprising:

a pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area smaller than that of the end opening and pipeline, there being a transitional portion of non-constant transverse cross-sectional area in each end portion between the respective end opening and the intermediate portion;

first and second transducer housings each enclosing a respective acoustic transducer, each housing:

(a) being locatable within the pipe section in respective ones of the end portions to define a measurement portion therebetween;

(b) being externally fluid dynamically shaped to substantially reduce pressure drop of the fluid as the fluid passes through the measurement portion; and (c) having a compartment for housing the respective acoustic transducer, the compartment comprising an acoustic signal transparent window facing towards the window of the other transducer through the intermediate portion thereby permitting signals to be passed between the transducers; and a control module electronically connected to the transducers to cause transmission and reception of acoustic signals through the intermediate section between said transducers to determine the velocity of fluid flowing in the intermediate section; and wherein the transitional portions have a profile which, in combination with the respective transducer housing, reduces pressure drop along the pipe section and acoustic back reflections from the transitional portions to the respective transducer.

Advantageously the intermediate portion has an internal radius ($r_i$) smaller than an internal radius ($r_o$) of the end portions to which the pipeline having a corresponding internal radius connects, wherein the internal radius ($r_t$) of each of two transition portions between the radii ($r_i, r_o$) in each end portion substantially corresponds to the equation:

$$r_t = \left(\frac{r_o + r_i}{2}\right) \pm \left(\frac{r_o - r_i}{2}\right) \tanh\left(\frac{\pi \chi}{L}\right)$$

where (L) is half the length of the transition region and ($\chi$) is the distance from the centre of the transition. Preferably, each of the end portions includes a flared periphery of a radius larger than the radius ($r_o$).

In one embodiment each transducer housing is positioned at least partly within the transitional portion to reduce the back reflections, whereby a minimum transverse cross-sectional area about each transducer housing is not less than the transverse cross-sectional area of the intermediate portion.

In a number of embodiments, the fluid meter further comprises mode control means configured to control effects of non-fundamental acoustic modes on a signal received by at least one of the transducers.

In one embodiment the mode control means comprises at least part of the measurement portion configured with a non-circular transverse cross-section. In particular, the mode control means comprises at least two interconnecting wall portions of the measurement portion, wherein at least one of the wall portions is curved and at least one other is substantially non-curved. Generally, the curved wall portion(s) has a transverse cross-section selected from the group consisting of a partial ellipse, a part circle, a parabola, an hyperbola, a cycloid, a hypocycloid, and an epicycloid, and the substantially non-curved wall portion is flat. Preferably, interconnections between the wall portions are integrally formed.

In another emodiment, the mode control means comprises at least a part of the measurement portion having a roughened interior fluid confining surface. Generally, the roughened interior surface comprises deviations from a smooth surface of between 0.01 and 8 millimeters.

In a further embodiment, the mode control means comprises a plurality of straightening vanes arranged within at least a part of the measurement portion. Advantageously, the straightening vanes comprise a plurality of elongate tubes arranged within the intermediate portion.

Usually, the fluid meter comprises a casing enclosing the control module, the pipe section passing through the casing, and the end portions extend beyond the casing for connection to the pipeline.

In a preferred embodiment, the control module is adapted to cause transmission of acoustic signals from the first transducer to the second transducer and vice versa and to determine therefrom a change in the time-of-flight of the signals between said transducers in the respective directions of transmission and thereby calculate the fluid flow velocity within the intermediate section and subsequently the velocity of fluid flow within the pipeline, the control module comprising electronic means configured to control effects of non-fundamental acoustic modes on a signal received by at least one said transducer.

In one application, the meter is a gas meter and each transducer housing has a distorted paraboloid external shape which is configured to prevent jetting of fluid on the transducer in the compartment.

In a further embodiment, the transducer housings each comprise support brackets configured so that the transducer housings can be located centrally within the pipe section and with sufficient clearance about an outer surface thereof so as to permit a ready flow of fluid about the housing. Generally, the support brackets are integrally formed with the transducer housing and form fluid dynamically shaped struts which minimise the degree of pressure drop of the fluid as it passes over the struts, the struts enclosing electronic connections between the transducers and the control module.

In a particular embodiment, the pressure drop along the pipe section is less than or equal to 125 Pa at a gas flow rate of 6 $m^3$/hour.

The housing may be made of plastic (e.g. polyethylene, polypropylene, polybutadiene, polyvinyichloride, PVA etc.), PTFE, ceramic, stainless steel or other like material. Generally a material is chosen which does not readily corrode in the fluid.

Typically, the transducer is an ultrasonic, electrostatic, piezo-ceramic or folded/profiled film type of transducer, however, the transducer is not limited thereto and transducers operating in the sonic or radio frequency region may be used for example.

Typically, the support brackets are integrally formed with the transducer housing and form fluid dynamically shaped struts which minimise the degree of pressure drop of the fluid as it passes over the struts.

In a preferred embodiment, two ultrasonic transducers are located, preferably 175 millimeters apart, in a gas pipe of 25 to 27 millimeters in diameter at either end of a narrower section of pipe 14 millimeters in diameter. This construction ensures that the pressure drop is less than or equal to 125 Pa at a gas flow rate of 6 $m^3$/hour.

A system in accordance with any of the above can be used to take fluid flow measurements for either liquids or gases. Generally, the gas can be domestic gas, methane, propane, oxygen, hydrogen or industrially useful gases. Advantageously, the system can be configured as part of a domestic or industrial gas meter specifically adapted for measuring the flow of so-called "natural gas". Applications for liquid flow measurement include liquid hydrocarbon and water metering, as well as a ships' log.

BRIEF DESCRIPTION OF THE DRAWINGS

A number of embodiments of the present invention will now be described with reference to the remaining drawings in which:

FIG. 6 depicts the fundamental and various high order acoustic modes present in a circular duct;

BEST OF OTHER MODES FOR CARRYING OUT THE INVENTION

Figure 2:
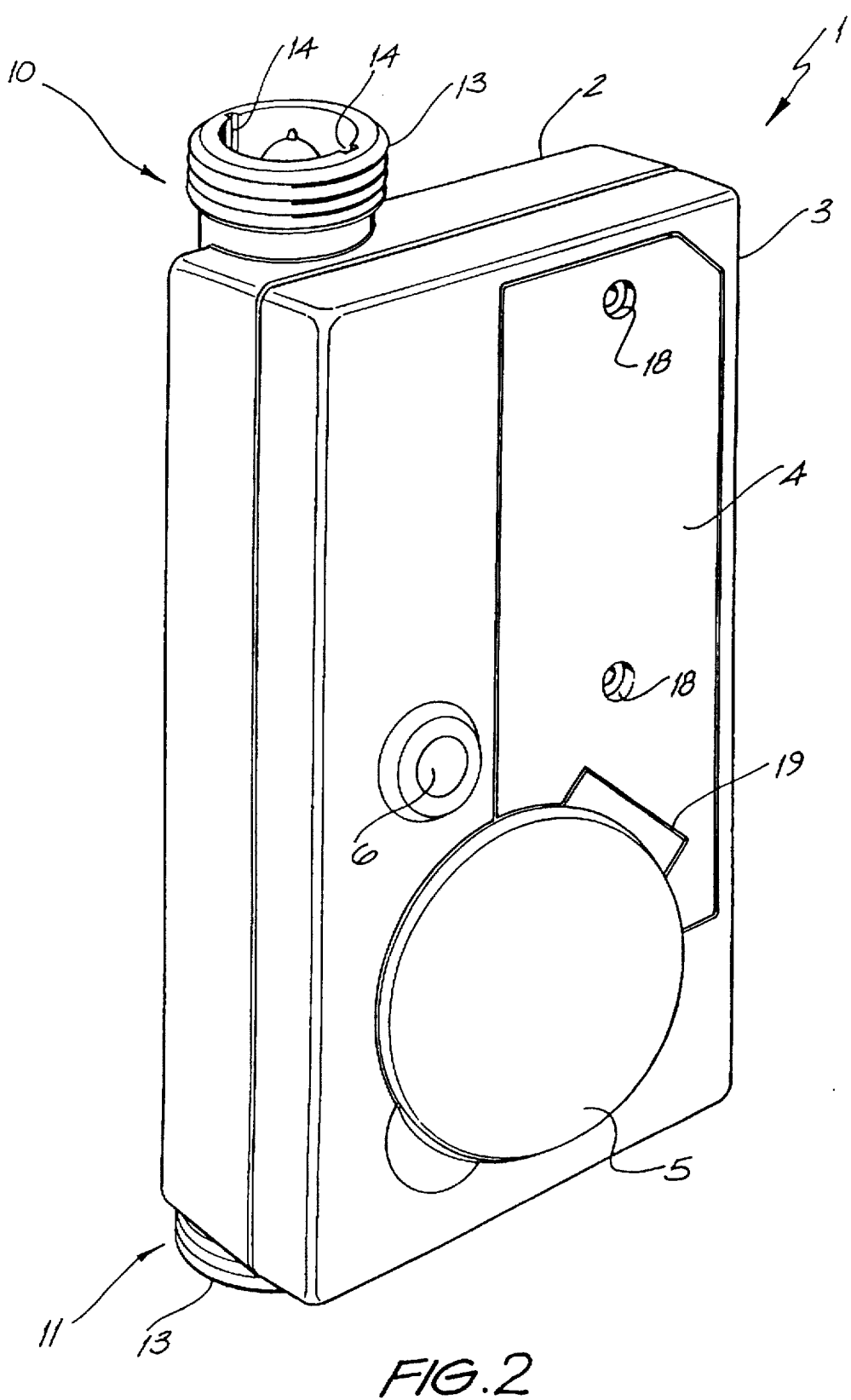
FIG. 2 is a perspective view of a gas meter.
Figure 3:
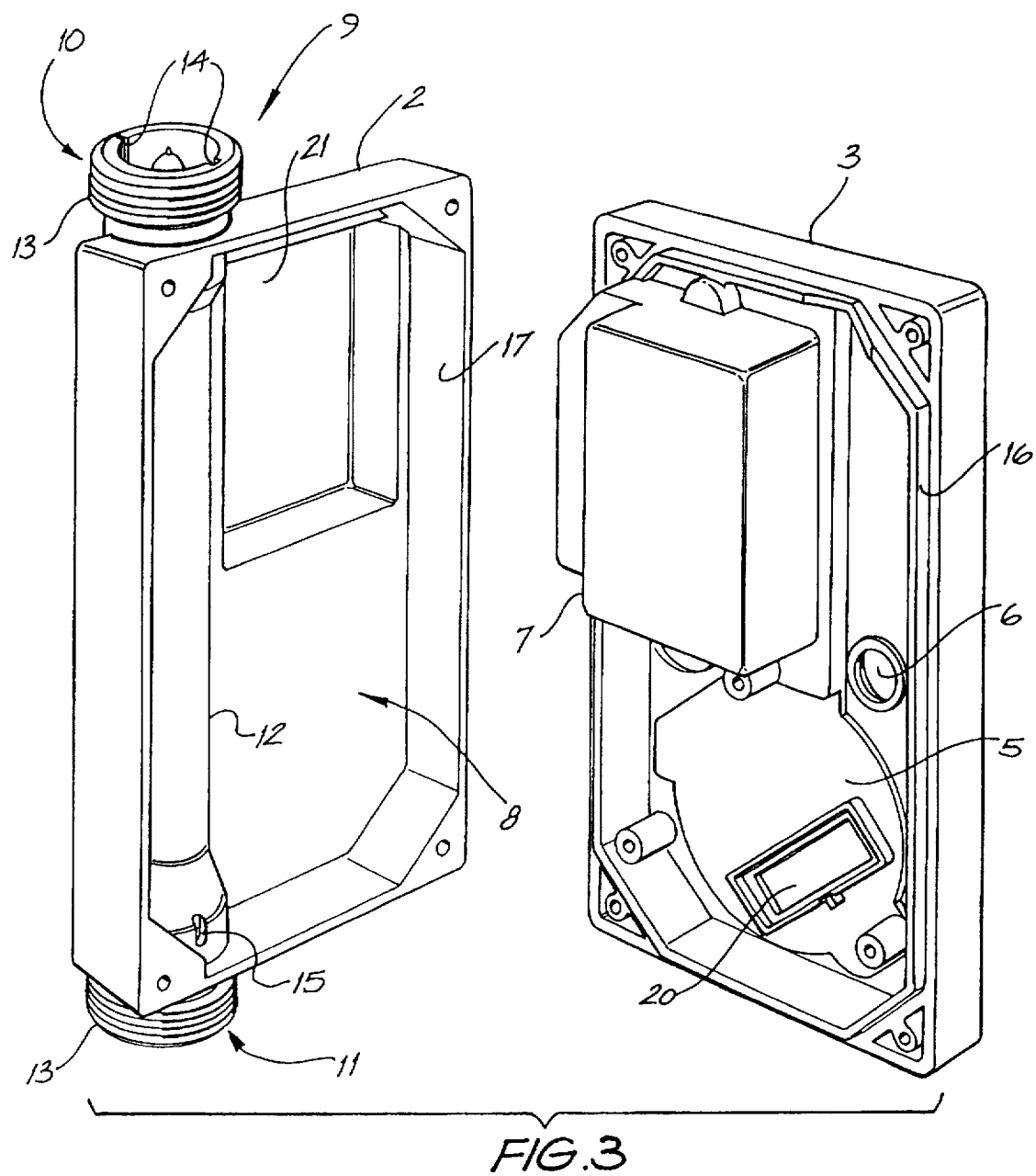
FIG. 3 is a perspective view of the interior of the meter of FIG. 2.

Turning now to FIGS. 2 and 3, a gas meter 1 of the preferred embodiment is shown formed of a casing base 2 and a casing lid 3. The lid 3 includes a battery compartment cover 4 integrally connected with a flap 5 by means of a hinge 19 which permits access to a display window 20, seen in FIG. 3, arranged under the flap 5. The cover 4 is securable to the lid 3 by means of screws fixable within two holes 18. An optical port 6 is provided which permits infra-red communications between the meter 1 and an external, generally hand held, interrogating device.

The base 2 includes a void 8 adjacent to the display window 20 which provides space for the locating of an electronics module (not illustrated, but seen schematically in FIG. 11) which is configured to instigate and calculate fluid flow measurements. An example of such an electronics module is that disclosed in International Patent Application No. PCT/AU92/00314 (WO93/00569) entitled "An Electronic Gas Meter", the disclosure of which is hereby incorporated by cross-reference.

Integrally formed in the base 2 is a measuring tube 9 formed of first end portion 10, a second end portion 11 and an intermediate portion 12 interconnecting each of the end portions 10 and 11 thereby permitting gas flow therethrough. Each of the end portions 10 and 11 is provided with a threaded connection 13 which permits insertion and coupling of the gas meter 1 into a gas pipeline (not illustrated).

The gas meter 1, using the electronics package is adapted to determine gas volumetric flow by determining the velocity of flow of gas within the measuring tube 9. This is achieved by arranging within each of the end portions 10 and 11, ultrasonic transducers which transmit therebetween acoustic pulses whose time of flight can be calculated and therefrom, the gas velocity determined. Using the determined velocity, the electronics package, having been pre-set with the physical dimensions of the measuring tube 9, can determine the volumetric flow rate. So as to permit positioning of the transducers (not illustrated in FIGS. 2 and 3) within the end portions 10 and 11, two channels 14 are arranged to permit the locating of a transducer housing (seen in FIGS. 11 to 15) within each end portion 10 and 11. An aperture 15 is provided in each of the end portions 10 and 11 which permits the making of electrical connections between each transducer and the electronics package located within the void 8.

The base 2 and lid 3 are generally moulded or die cast using plastics material or metals. Examples of specific materials that can be used are zinc, aluminium, PVC, PVA, and the like.

Figure 4:
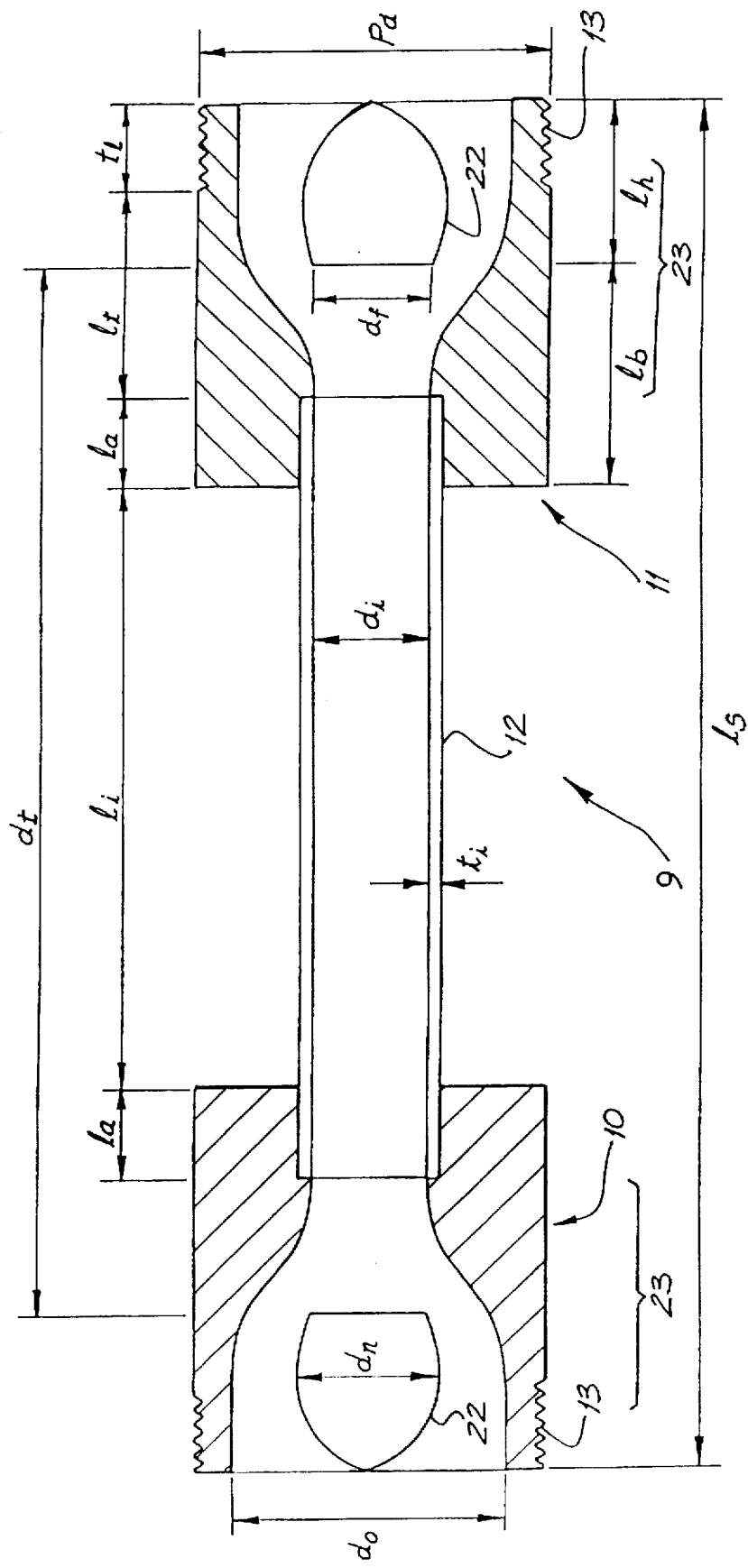
FIG. 4 is a schematic representation of the pipe section of the meter of FIGS. 2 and 3.

Turning now to FIG. 4, the measuring tube 9 is shown in more detail in which each of the end portions 10 and 11 encloses an aerodynamic transducer housing 22 within which an acoustic transducer coupled to the electronics package can be located. A preferred example of such a transducer is that disclosed in International Patent Application No. PCT/AU91/00157 (WO91/17637), the disclosure of which is hereby incorporated by cross-reference.

In the case of the "time-of-flight" ultrasonic meter, the velocity of flow is determined from the difference in the reciprocal of the time of travel of an ultrasonic pulse between a pair of transducers in the upstream and downstream directions. The accuracy and repeatability depends upon maintaining an unambiguous signal at all flows and temperatures. A clear signal essentially unaffected by acoustic interference, such as echoes, excess attenuation, interacting higher order acoustic modes, or by fluid mechanical interference (turbulence, changes in flow pattern and velocity profile, kinetic energy effects due to the contraction or expansion of the area of cross-section) and so on, is required for accurate measurements.

The meter configuration of the preferred embodiment represents a compromise between competing requirements. The accuracy of a time-of-flight ultrasonic meter is enhanced by a longer measuring tube, or acoustic path, between the transducers since the time of flight is lengthened, and by a narrower tube or bore since the flow velocity, and hence the difference in upstream and downstream flow times, is increased for the same volumetric flow rate. However, lengthening the metering tube or decreasing the tube bore will increase the pressure drop through the meter. A maximum allowable pressure drop for domestic gas meters is specified by the gas supplier and varies from country to country. In Australia, the maximum allowable pressure drop is 125 Pa.

In the configuration of FIG. 4, the measuring tube 9 is adapted to connect to a pipeline having a nominal 1.5 inch (38.10 mm) internal diameter, and accordingly, the diameter of the pipeline connection ($p_d$) at the threaded connections 13 is about 37 millimeters. The thread 13 has a length ($t_l$) of about 15 millimeters. In order to permit significant flow velocity increase within the measuring tube 9, the internal diameter is reduced from a value ($d_o$), preferably 27 millimeters in the end portions 10 and 11, to a diameter ($d_i$) of the intermediate portion 12 preferably 14 millimeters whilst a distance ($d_t$) between the transducers arranged within the housings 22 of 175 millimeters provides for a sufficient time of flight of the acoustic signals, yet maintains a compact configuration to the overall gas meter 1 through maintaining the overall length ($l_e$) of the measuring tube 9 to about 215 millimeters.

Conical enlargements and contractions within fluid carrying pipes are regularly employed to minimise kinetic energy losses and pressure head losses due to flow deceleration or acceleration. Streamlines are best maintained and kinetic energy losses minimised by exponential flaring. In the preferred embodiment, the transducer housing 22 is placed within the end portions 10 and 11 and one contraction and a corresponding expansion of the pipe diameter are used to maintain the streamlines. The expansion and contraction of the pipe diameter define transitional section 23 which are arranged solely within end portions 10 and 11 as seen in FIG. 4.

Figure 5:
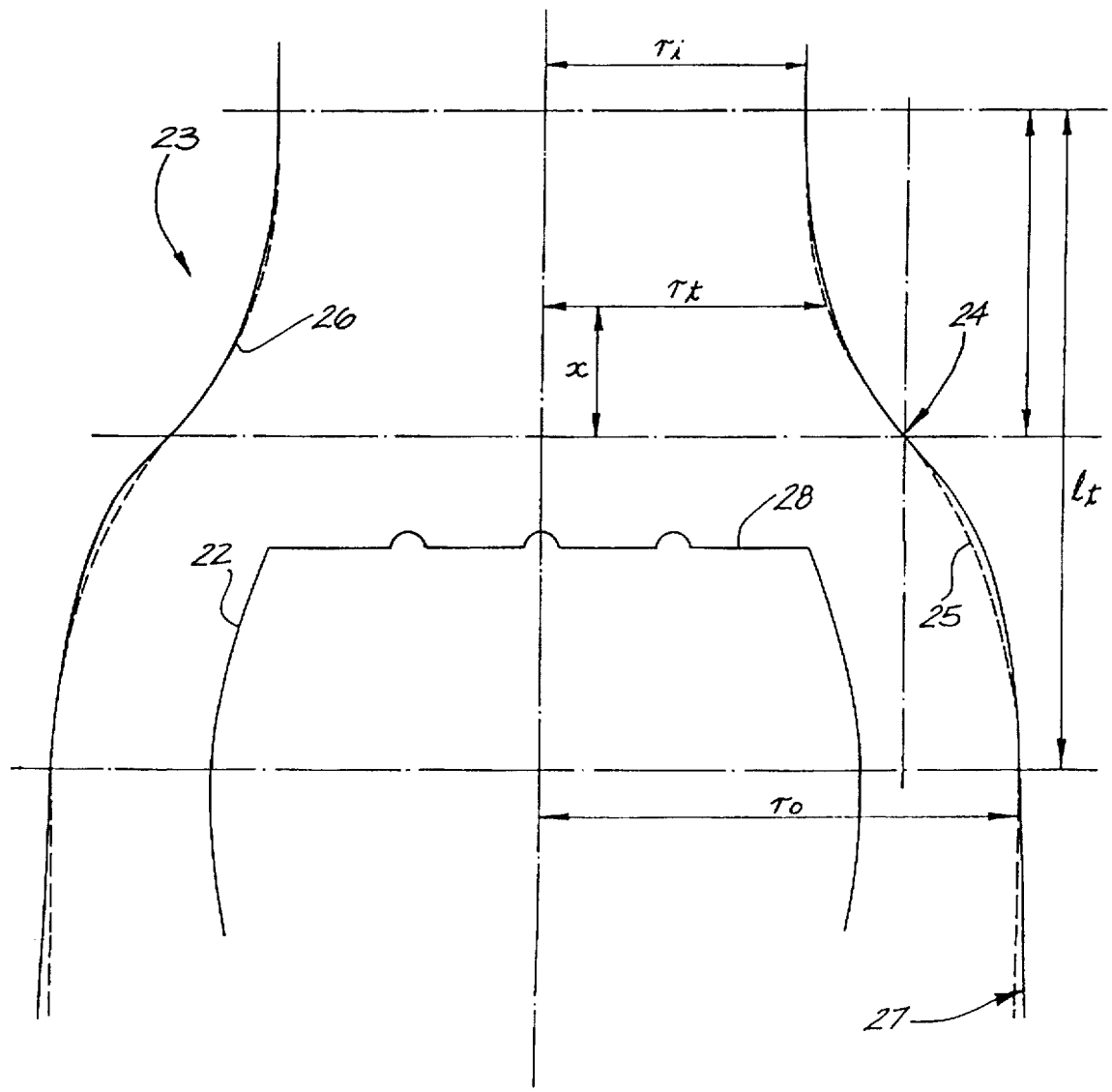
FIG. 5 is an enlarged representation of the transition between the intermediate and end portions of the pipe section of FIG. 4.

Specifically, referring to FIG. 5, the transitional section 23 of the measuring tube 9 is shown which widens about the transducer housing 22 for coupling to the gas pipeline (not illustrated). Experimental results have indicated that the configuration illustrated provides a minimal pressure drop through the transition to the intermediate portion 12. Also, such an arrangement provides for pressure recovery at the opposite end of the measuring tube 9.

Experiments conducted by the present inventors showed that the profile of the transitional section 23 was obtained by relating the tube radius ($r_t$) to the hyperbolic function tanh $\chi$, such that:

$$r_t = \left(\frac{r_o + r_i}{2}\right) \pm \left(\frac{r_o - r_i}{2}\right) \tanh\left(\frac{\pi \chi}{L}\right)$$

where (L) is half the length of the transition region and ($\chi$) is the distance from the centre of the transition being the inflection point 24.

That is, the tube radius ($r_t$) is a symmetric hyperbolic function varying between the maximum and minimum radii centered on a reference point.

Using the preferred dimensions of the tube 9 indicated above, this gives $$r_t(\text{mm}) = (10.25) \pm ((3.25)\tanh(0.392\chi(\text{mm}))).$$

The above equation gives a theoretical profile 25 shown in dashed lines in FIG. 5.

Due to the location of the transducer housing 22, partially within the transitional section 23, a preferred profile 26 (shown in solid lines in FIG. 5) is chosen that provides a slightly increased flow area in the vicinity of the front face 28 of the transducer housing 22. To permit moulding of the measuring pipe 9, a 2° flare 27 of the radius ($r_o$) is employed.

In the preferred embodiment, the intermediate portion 12 is configured at a reduced cross-sectional area compared to that of the end portions 10, 11 so that the velocity of gas is increased, which permits greater accuracy in time of flight measurements and, in particular, more accurate volume determinations at gas pilot flow rates. However, such an arrangement, in view of pressure drop considerations, necessitates placement of the transducer housings 22 within the end portions 10, 11 thereby causing the transducers to transmit toward the wall of the respective transitional section 23. Traditionally, such an arrangement causes back-reflections to arise through the sound wave reflecting off the transitional section 23 back to the transmitting transducer. This acts to add noise to the composite acoustic signal that propagates along the measuring tube 9 resulting in increased difficulty in accurate detection of the arrival of an acoustic pulse.

In the preferred embodiment, this problem is substantially lessened by a number of features. Firstly, as indicated above pressure drop is minimised using fluid dynamically shaped transducer housings 22 and by relating the shape/profile of the transitional sections to a combination of exponential functions, such as that provided by the tanh $\chi$ function. Also, by positioning the transducer housings 22, and hence the transducer therewithin, sufficiently close to the respective transitional section 23, in the manner illustrated in FIG. 5, dispersion of the acoustic wave is substantially limited to those portions of the measuring tube 9 beyond the inflection point 24 and towards the intermediate portion 12. In addition, the profile of the transitional sections 23, in that region of the tube 9, acts to guide any reflections into the intermediate portion 12 rather than back towards the transmitting transducer.

Accordingly, the combination of the transducer housings 22 and their placement at or near the transitional sections 23 act to optimise signal transmissional by reducing back-reflections, whilst minimizing pressure drop along the tube 9 to be within, the 125 Pa statutory requirement in Australia for domestic gas reticulation systems.

Testing has confirmed that with the transducer housing 22 located as shown in the throats in the entry and exit flared sections, minimal pressure drop and an optimal ultrasonic signal are obtained.

It is seen from International Patent Application No. PCT/AU92/00315 (WO93/00315) entitled "Mode Suppression in Fluid Flow Measurement", that the reduction of propagation of high order acoustic modes can provide a significant increase in the accuracy of fluid velocity measurements. A method employed in that specification to reduce high order mode propagation is to electronically cancel out the effects of the high order modes. However, the present inventors have determined that a smooth measuring tube, although reducing the pressure drop caused by the meter 1, also aids in the propagation of high order acoustic modes.

The present inventors investigated various ways in which the propagation of high order acoustic modes can be lessened in the measuring tube 9, and specifically the intermediate portion 12.

When a pulse of sound is launched down a tube or duct, it excites a number of acoustic modes that carry the signal. The modes may simply be thought of as reflections from the wall of the tube or may be considered as the vibrations of the stretched skin of a drum but propagated through space. Both of these analogies have their uses but each is limited.

The reflection analogy enables the determination that the velocity of propagation along the tube of the modes which are reflected more times, will be slower. The fastest mode is the plane wave or fundamental mode, which is not reflected. The plane wave mode propagates along the tube with the speed of sound in free space, denoted by c. The other modes, because of their reflection(s) from the tube wall, propagate along the tube at a wide range of velocities from almost c down to zero, though strictly speaking, a mode with zero velocity does not propagate. In general, the slower modes are less excited, and therefore have smaller amplitudes, than the faster modes. For modes having propagation velocities less than c/5, the amplitude generally becomes only one or two percent of the main amplitude. Each mode except for the plane wave has a cut-off frequency below which it will not propagate in that particular duct. For the frequency and duct size involved, there are very many modes above cut-off.

Whilst the modes are separate entities, they superimpose to give an almost continuous signal. Some modes are more strongly received than others and so the total :signal has a lumpy appearance, as shown in FIGS. 1A–1D, from which it will be seen that there are modes that are considerably larger than the modes of similar velocity on either side.

Figure 1A:
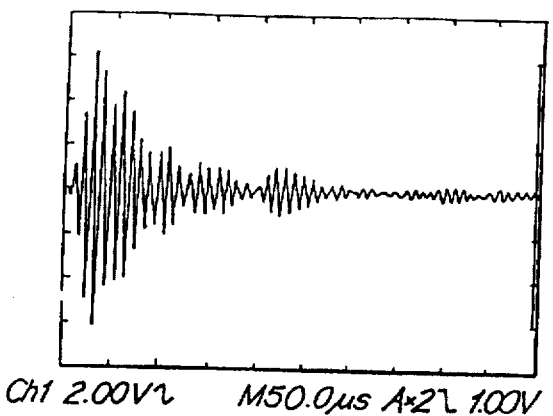
FIGS. 1A–1D are graphs illustrating signals received from prior art ultrasonic measuring devices.
Figure 1B:
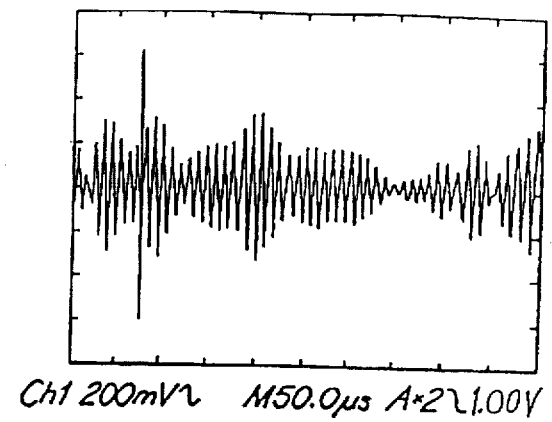
Figure 1C:
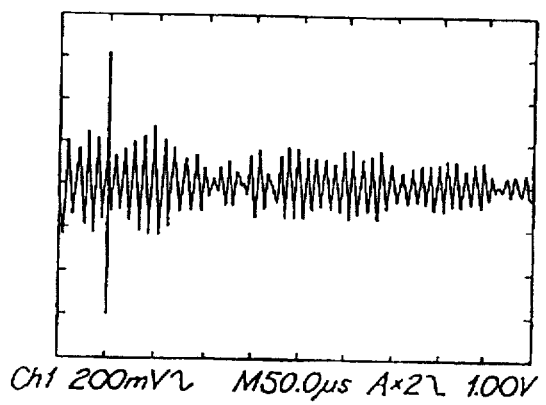
Figure 1D:
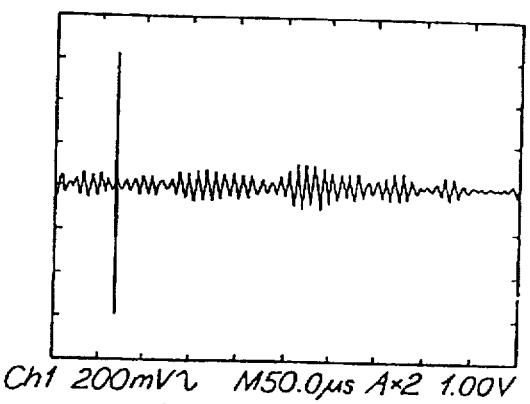
Figure 1E:
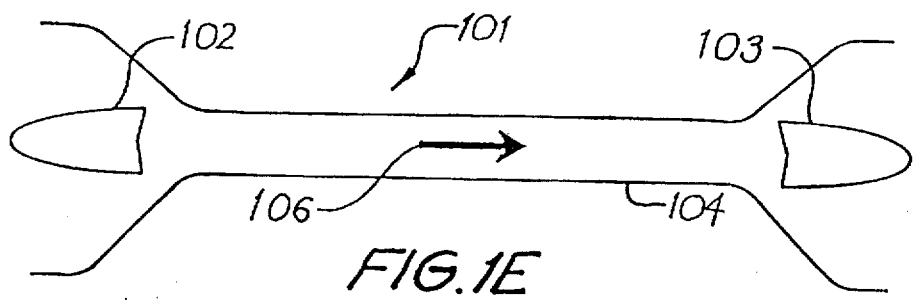
FIG. 1E illustrates a prior art ultrasonic measurement apparatus.

FIG. 6 shows a number of representations, using the drum head analogy, of some of the faster modes present in the conventional circular duct 104 of FIG. 1E. The (0,2) mode is a vibration of the central portion out of phase with the perimeter. This is expected because the transducers 102, 103 act in the central part of the duct 104 where they cause strong excitation. The velocity of the (0,2) mode is only slightly lower than that of the plane wave (0,1) mode so that the signal received is an addition of those two modes, unless a very long tube is used which allows the modes to separate. For a cylindrical duct the exact phase relationship of the two signals determines the magnitude of the received composite signal. The phase relationship depends on the diameter of the duct 104, the length of the duct (between the transducers 102, 103), and on the plane wave velocity.

The velocity of sound, the plane wave velocity, is given by $$C = \sqrt{\frac{\gamma P}{\rho_o}}$$

where $\gamma$ is the ratio of specific heats, P is the pressure, and $\rho_o$ is the density of the gas. Thus the velocity will depend on the nature of the gas and, for a particular gas at a fixed pressure and an absolute temperature T, the velocity will be given in terms of the velocity at some standard temperature, in this case 273 K, by $$C = C_{273}\sqrt{\frac{T}{273}}$$

A change in the value of C alters the phase relationship and can alter the magnitude Of the composite signal considerably. This amplitude can also be influenced by a converging flow.

Figure 7:
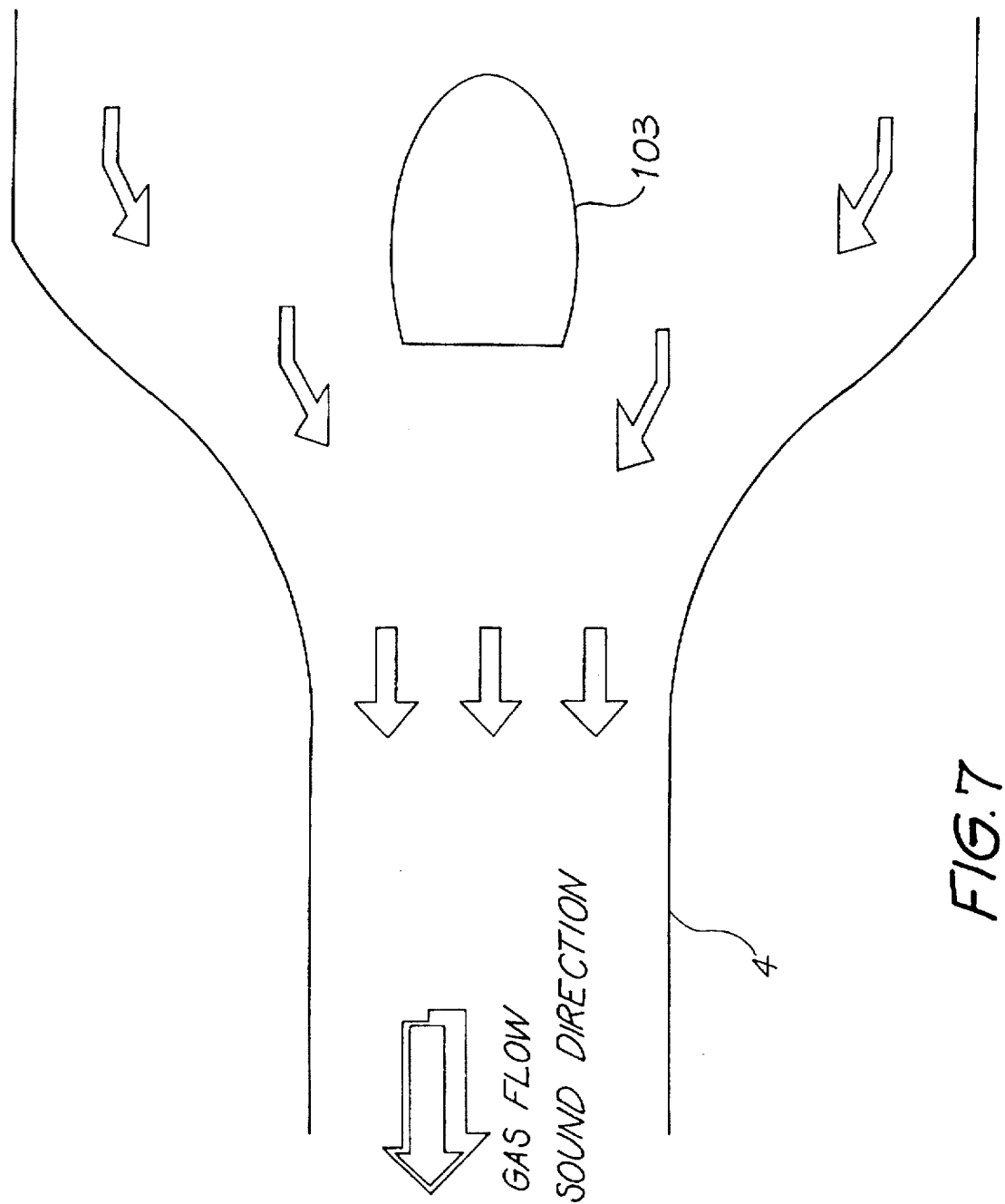
FIG. 7 illustrates a converging flow and the (0,2) modes.
Figure 8:
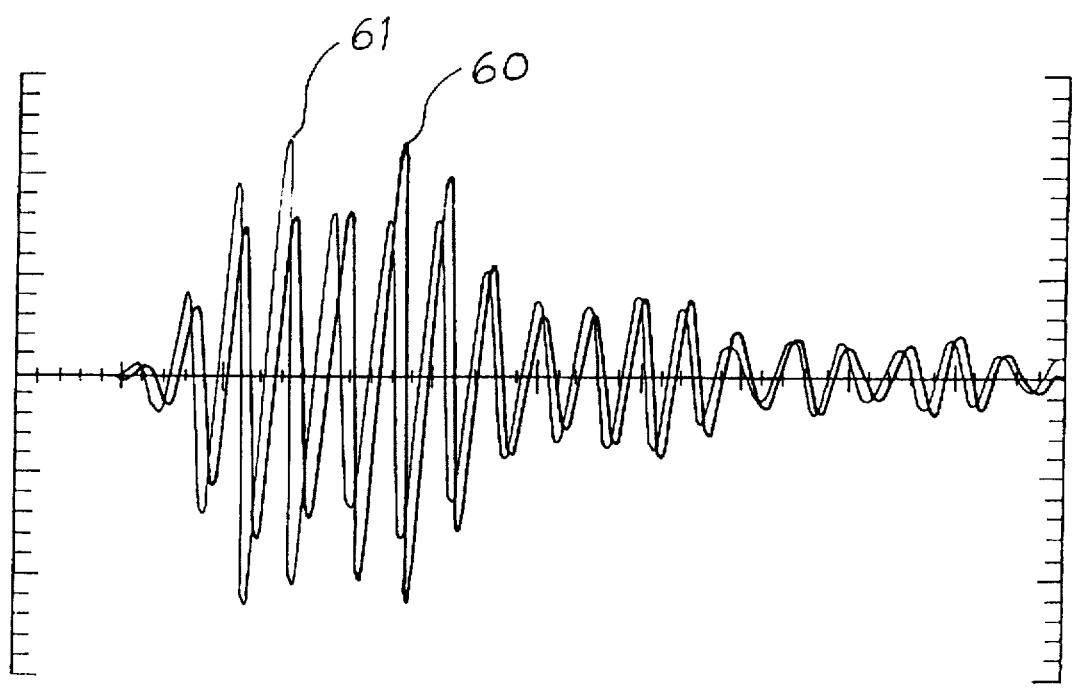
FIG. 8 shows the received waveform of FIG. 7.

Similarly, transmission into a converging flow is shown in FIG. 7. The waveform received in such a situation is shown in FIG. 8 where it will be seen that the second maximum 60 in the envelope is larger than the first 61. One possible explanation for this is that the converging velocity field bends the sound from the transducer 103 which would otherwise be lost into a region on the perimeter of the smaller diameter section. A similar effect can be seen with hot gas in a cold tube (to be discussed later). This makes the detection of a particular zero-crossing substantially more difficult.

Though the discussion has so far been concerned with the (0,2) mode there are very many other modes. These are generally of smaller amplitude than the (0,2) mode but in certain circumstances they can cause difficulties. This is particularly so in the use of the ring-around technique, described in detail in International Patent Application No. PCT/AU92/00314.

In this technique, when a signal is detected, a new pulse is immediately transmitted. Because of the very long tail of higher order modes on the signal, this retransmission arrives at the receiver while the previous signal still has a significant amplitude. In effect, there is a layering of signals with contributions from the higher modes of a number of previously transmitted pulses. These higher modes will add to the plane wave mode and produce a resultant which is the signal upon which the timing of the next transmission is based.

The first part of the first received signal will be free of all other modes; the second received signal will contain the plane wave mode from the second transmission and those modes which travel at one half the speed of the plane wave, i.e. c/2, from the first transmission. The third received signal will be the sum of the plane wave from the third transmission, modes with velocity c/2 from the second transmission and those with velocity c/3 from the first transmission. The extension to the fourth, fifth and so on received pulses will be apparent to the skilled addressee. Furthermore, with reference to FIG. 1, the amplitudes become small as the mode order becomes high so that there is little effect on the received signal from modes of velocity less than c/4.

It can be shown theoretically or seen experimentally that the effect of flow on the received signal is to move the received signal as a whole along the time axis so that its shape is, in the main, preserved. The arrival time of the particular zero-crossing that has been chosen as the timing marker will vary with the flow. The arrival time will be longer or shorter depending on whether the transmission of the signal is upstream or downstream. The particular parts of the long tail of the received signal that add in the layering process described above will be those parts of the tail that are integral multiples of this time after the selected zero-crossing. The exact combination will thus vary with the flow.

This addition of other (high order) modes, whose phases vary with flow, to the plane wave, in the ring-around technique alters the time of the zero-crossing from that for the plane wave alone, that is, from that that would apply for a single transmission. When flows are calculated from transit times derived from the ring-around process the high order modes cause a periodic deviation from a straight line response as the flow varies over the range from no flow to maximum. This problem has been addressed by the transmission of an inverted pulse once in four transmissions as described In International Patent Application No. PCT/AU92/00315.

However, this does not prevent the amplitude of the received signal from changing. When an inverted pulse is transmitted, the signal from higher modes which previously had been adding to the amplitude of the plane wave signal, will be subtracted from the plane wave. Thus the detection system must be able to detect reliably the correct zero-crossing when the amplitudes of the early peaks in the received signal are altered by amounts corresponding to those higher modes. It is therefore generally easier for the detection circuit to operate effectively if the magnitude of the higher modes, with velocities approximately c/2, c/3, and so on, is as small as possible.

Through examination of the nature of the modes as shown in FIG. 6, they are all seen to possess a high degree of symmetry based on the circular cross-section of the metering tube. Thus, in order to minimise the high order modes, it was observed necessary to break or change the symmetry of the geometry of the tube as much as possible. There is a counteracting principle however in that the wall perimeter should not be too large. The pressure drop in the flowing gas will be higher for a shape with a larger wall perimeter than for a circular cross-section of the same area. It is also undesirable to have a shape that is substantially re-entrant for reasons of contamination.

In one preferred embodiment, the walls of the measuring tube 9 are toughened using grooves and/or bumps which are comparable in size to half the wavelength of the acoustic signal, generally between 0.01 and 8 millimeters for the broader ultrasonic frequencies and preferably between about 0.25 and 2 millimeters for the frequencies able to be employed using the apparatus disclosed in the aforementioned international Patent Applications. Such a toughening was found sufficient to reduce the contribution of higher order acoustic modes whilst permitting the plane wave mode to dominate at all flows and temperatures, without appreciably increasing the frictional resistance to flow (the pressure drop) within the tube 9.

The appropriate toughened surface finish to achieve high order mode damping can be provided by casting from an appropriate mould or by figuring the tube wall with a helical groove of pitch approximating the acoustic half wave length.

The effect of a particular higher mode is reduced because the energy it contains is spread over a finite time. That is, if the mode is reflected off a perfectly cylindrical surface, all of the mode front arrives at the transducer simultaneously and its full effect is felt.

Roughening or distorting the surface causes a proportion of the mode front to travel over a slightly longer distance thereby reducing the total instantaneous contribution. Excessive roughening of the tube surface, although reducing the influence of high order modes, can significantly increase the pressure drop.

Alternatively, straightening vanes extending from the interior surface of the intermediate portion 12 can be used. Typically the vanes can be sized between 0.25 and 2 millimeters. In an alternative configuration, the vanes can be formed by inserting a plurality of elongate tubes, such as drinking straws, into the intermediate portion.

Figure 9A:
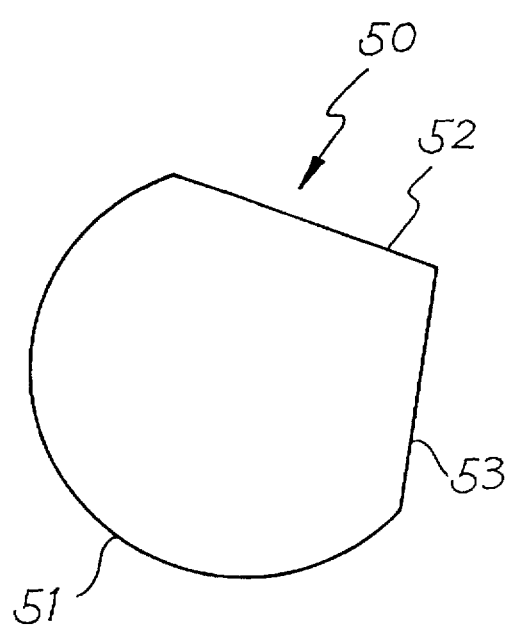
FIGS. 9A and 9B illustrate two tube shapes representing further embodiments which reduce the effects of high order modes resulting from the use of the ring-around technique.
Figure 9B:
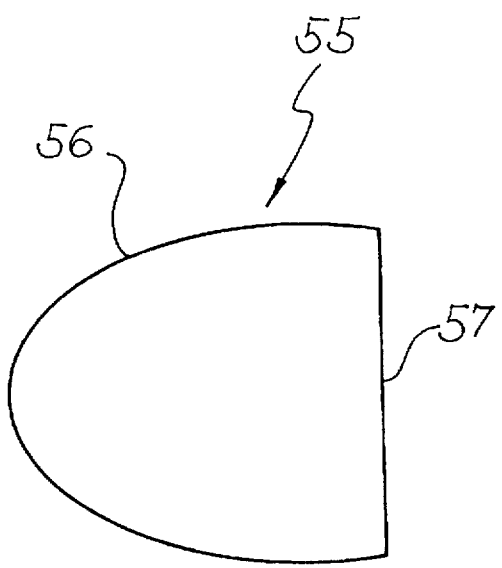
Figure 10A:
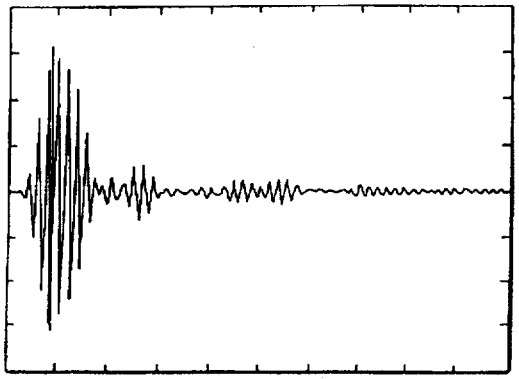
FIGS. 10A-10D are views similar to FIGS. 1A-1D but of a tube incorporating the shape of FIG. 9A.
Figure 10B:
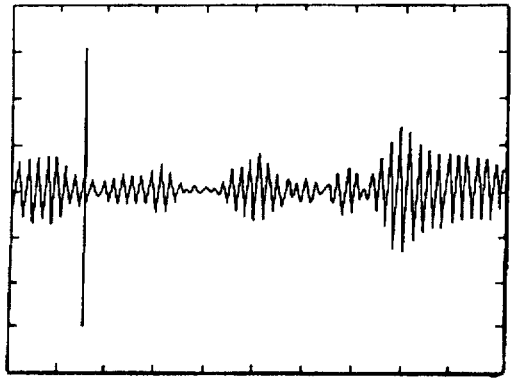
Figure 10C:
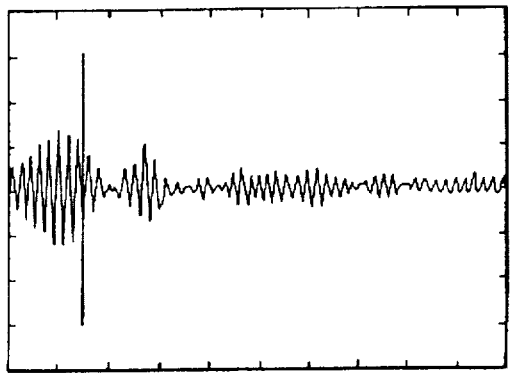
Figure 10D:
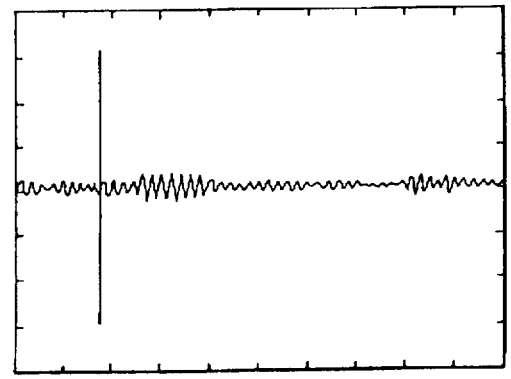

A further embodiment is shown in FIGS. 9A and 9B which illustrate two cross-sections of metering ducts that represent an alternative compromise between the criteria mentioned previously. FIG. 9A shows a cross-section of a duct 50 which include a substantially semi-circular curved portion 51 and two flat faces 52 and 53. FIG. 9B shows a duct 55 having a part elliptical curved portion 56 and a single flat face 57. The ducts 50 and 55 operate on the principle that high order modes tend to be reflected from the wall of the duct and in each case, modes reflected off the flat faces 52 and 53, or 57 are reflected onto, and dissipated on, the curved faces 51 and 56 respectively which, in view of the greater circumferential length (and their surface area), reduce the sound pressure level and hence amplitude of the high order modes.

The ducts 50 and 55 can be incorporated into the intermediate portion 12 with appropriately shaped mouldings at both ends thereof to couple with the transitional sections 23 of FIG. 5. In this manner, the cross-sectional area of the duct 50, 55 can be substantially matched with that of the reduced diameter of the transitional sections, thereby avoiding unwanted pressure drop.

FIGS. 10A–10D show the signal received through the duct 20 of FIG. 9A. The drive to the transducer has been adjusted so that the signal has the same peak amplitude as the signal in FIGS. 1A–1D, and from which it is seen that the amplitude of the higher modes is much diminished. However, its behaviour with respect to the preservation of peak heights in the received signal during downstream flow is poor.

Turning now to FIGS. 11 to 15, the transducer housing 22 is seen to conform to the classic airfoil or hydrofoil shape, though for reasons of meter symmetry, the transducer housings 22 must be opposed, as in the manner shown in FIG. 4.

The transducer housing 22 is formed of front body 29 and a substantially conical, rear body 30 which mate together and enclose an ultrasonic transducer. A main strut 31 and a secondary strut 32 extend from the bodies 29 and 30 and permit locating the transducer housing 22 within the end portions 10 and 11 through engagement of the struts 31 and 32 in the channels 14 seen in FIGS. 2 and 3.

The front body 29 has an substantially flat front face 28 in which a window 33 is formed. The window 33 is arranged to permit communication between the transducer within the housing 22 into the surrounding gas flow, and is adapted depending on the specific energy transmission being used. In the preferred embodiment, the transducer emits ultrasonic waves and therefore the window 33 is arranged to be at least substantially ultrasonically transparent. Three protective bars 34 are arranged In the window 33 to protect the transducer from physical damage.

The configuration of the transducer housing 22 and the struts 31 and 32 promote a streamline flow and hence minimise the separation of boundary layers. The protective bars 34 are situated within the near-field region of the transducer so as to ensure that no perturbation of the ultrasonic wave front is introduced by the bars 34.

The transducer housing 22 has a maximum diameter ($d_m$) of 17 millimeters which reduces to a diameter ($d_f$) of 14 millimeters at the face 28 (see FIG. 4).

The reduction in the housing diameter ($d_m$) and the position of the transducer housing 22 in the flared section 27 of the measuring tube 9 ensure that the cross-sectional area of flow is approximately equal to, but not less than, the meter bore (the intermediate portion 12) of 154 mm$^2$ so as to encourage a streamlined flow.

The positioning of the transducer housing 22 and the relationship with the meter profile is also chosen to eliminate any interference with the propagating ultrasonic signal, either by reflection or by mode interference (augmentation).

Figure 11:
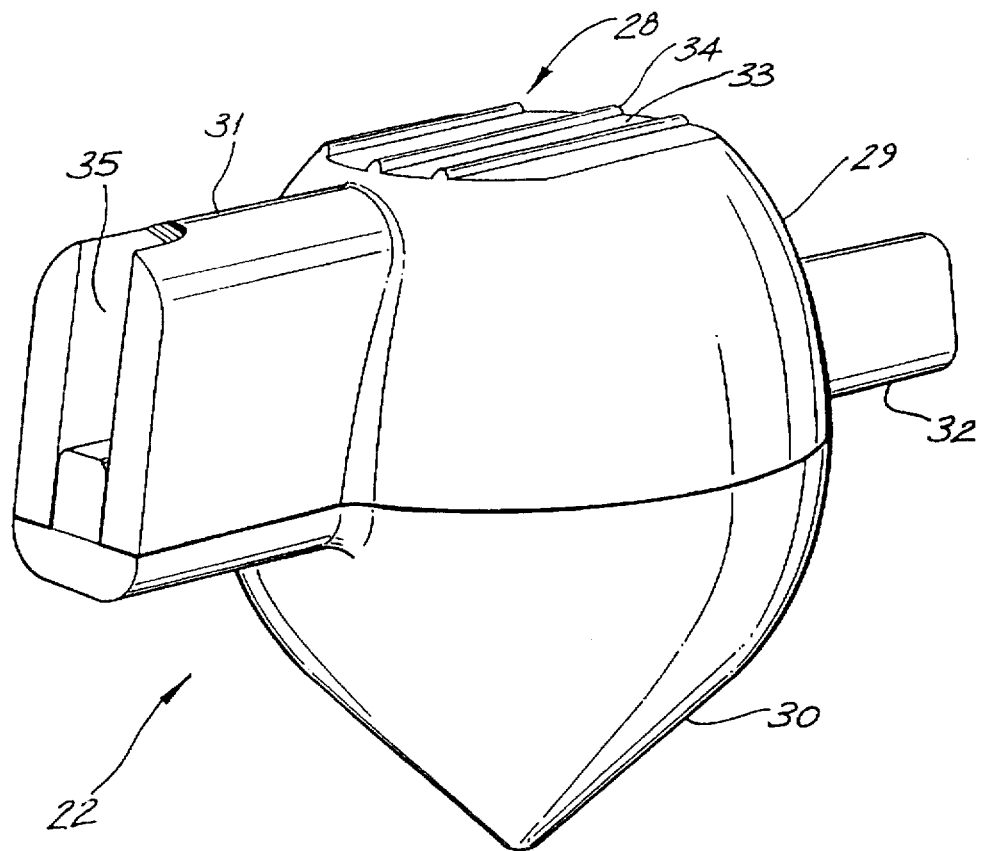
FIG. 11 is a perspective view of a transducer housing used in the flow meter of FIGS. 2 to 5.
Figure 12:
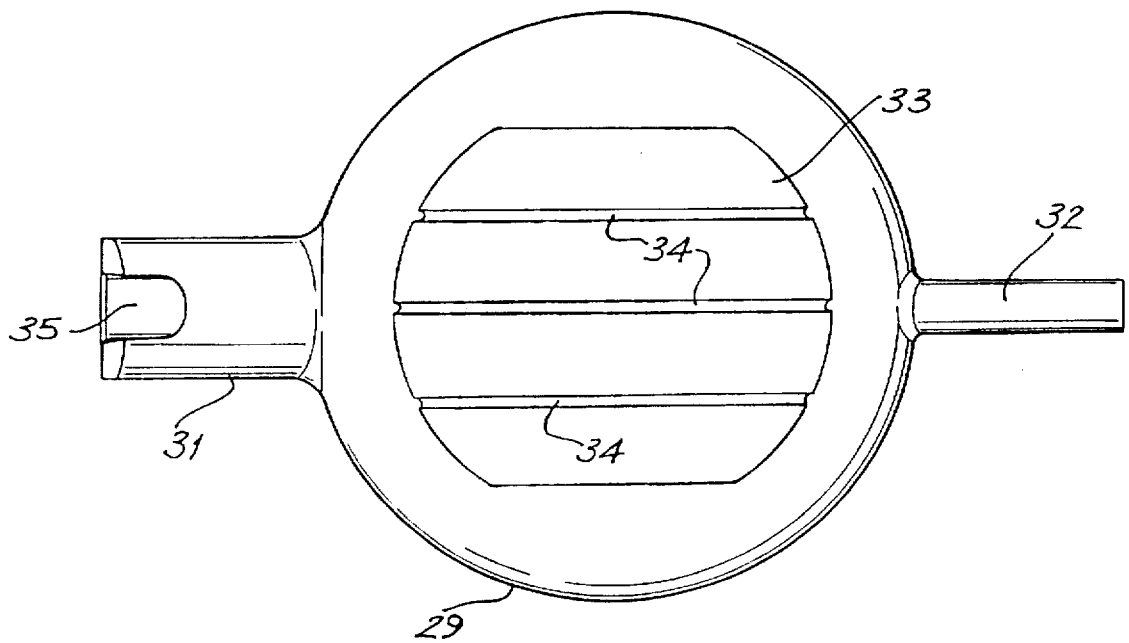
FIG. 12 is a plan view of FIG. 11.

As seen In FIG. 11, the main strut 31 includes a recess 35 which communicates with the interior of the housing 22 and permits interconnection of the transducer with the electronics package via the aperture 15 seen In FIG. 3.

Figure 15:
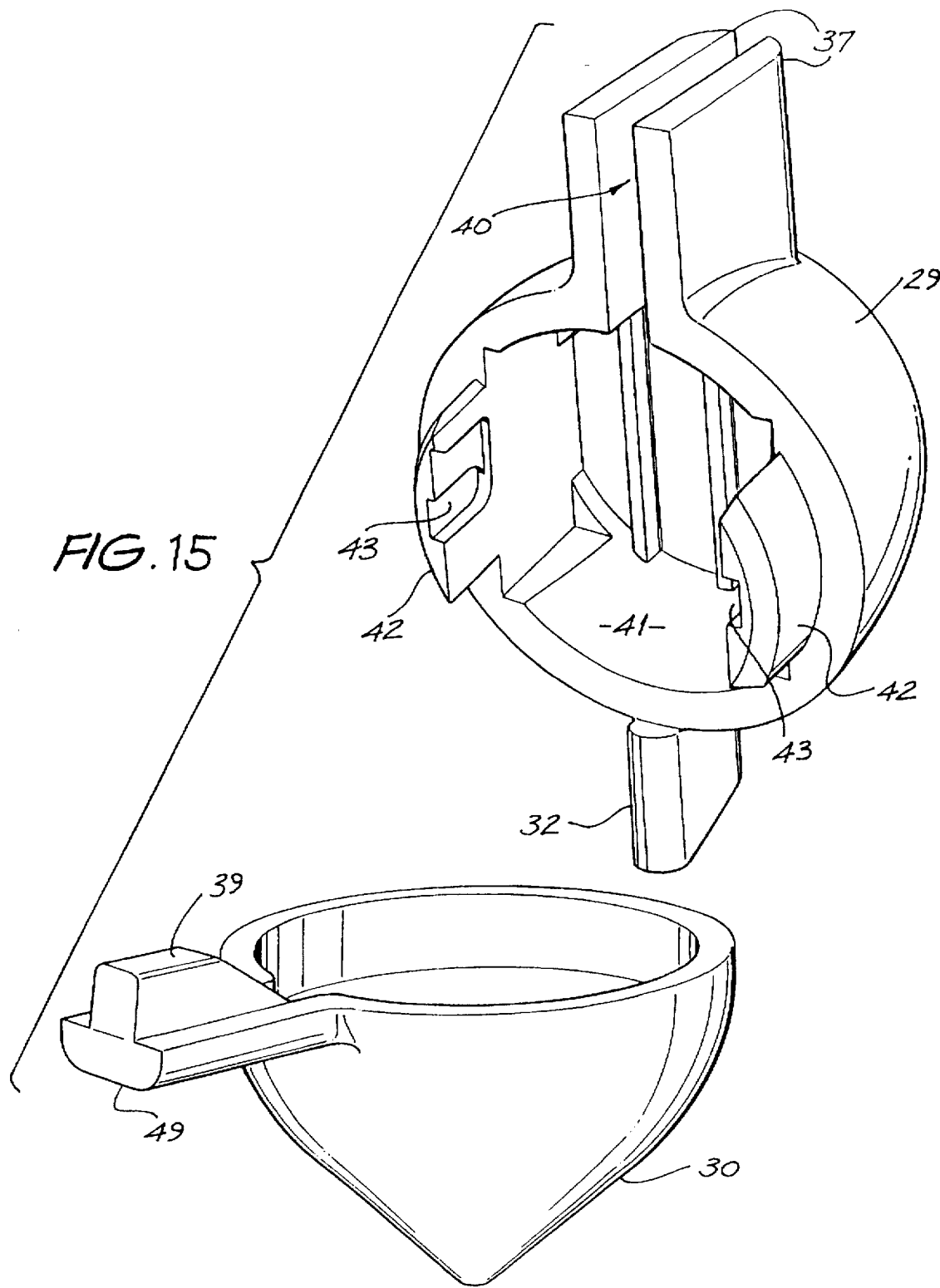
FIG. 15 is an exploded perspective view illustrating the interior of the transducer housing of FIGS. 11 to 14.

Referring to FIG. 15, the main strut 31 is formed by two extensions 37 arranged in parallel extending from the front body 29 and between which a channel 40 is located. Extending from the conical body 30 is an extension 49 which includes a flange 39 arranged to mate with the channel 40 as an interference fit.

The channel 40 extends to the interior 41 of the front body 29 from which are seen extending two extensions 42 which include recesses 43. The recesses 43 are configured to provide a snap interconnection of a transducer mounting block within the transducer housing 22.

Figure 13:
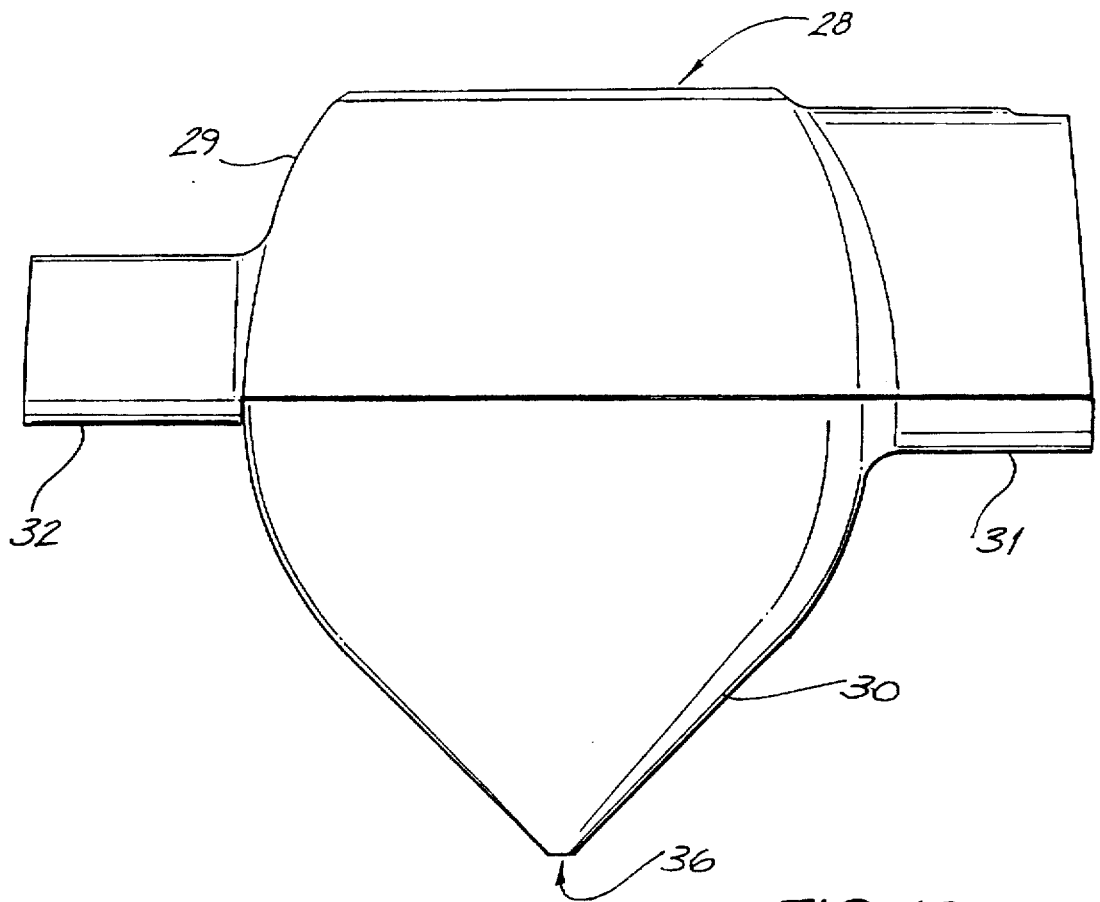
FIG. 13 is a side elevation of FIG. 11.
Figure 14:
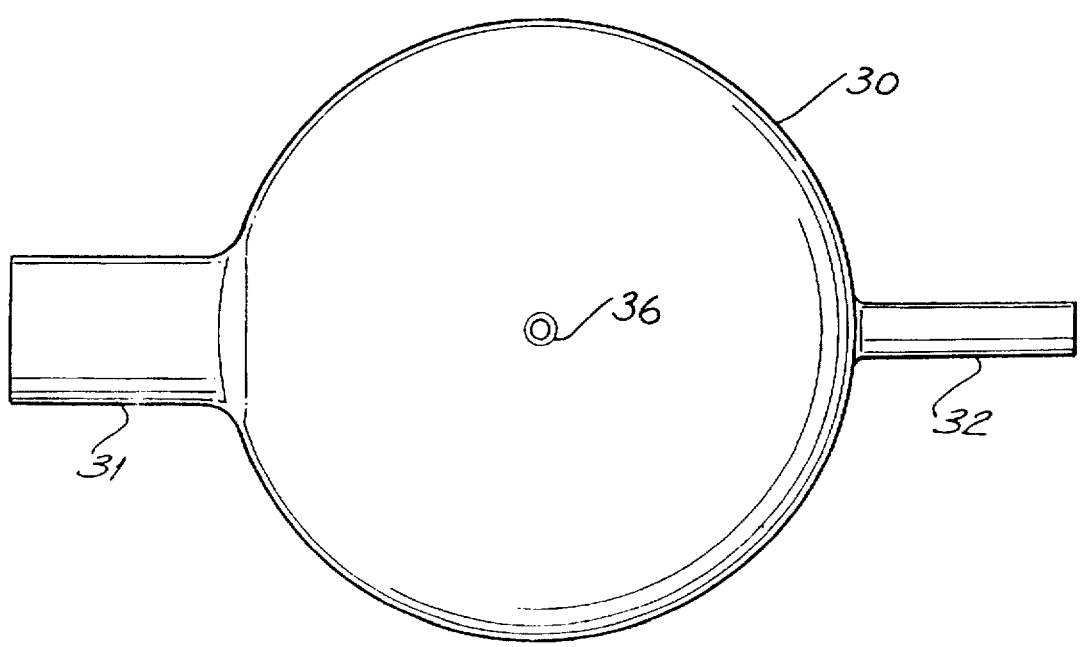
FIG. 14 is an inverted plan view of FIG. 11.

As best seen in FIGS. 13 and 14, the conical body 30 includes an aperture 36 arranged for the insertion of a round-headed thermometer element into the leading profile of the upstream transducer housing 22. This eliminates the tendency for a stagnation point and promotes streamlining around the housing 22. The arrangement of the thermometer element is seen in FIG. 11 where a round-headed thermometer element 44 is shown extending through the aperture 36. The thermometer element 44 interconnects with the electronics package and provides for temperature compensation of the operation of the electronics in accordance with changes of temperature of the gas being measured.

Figure 16:
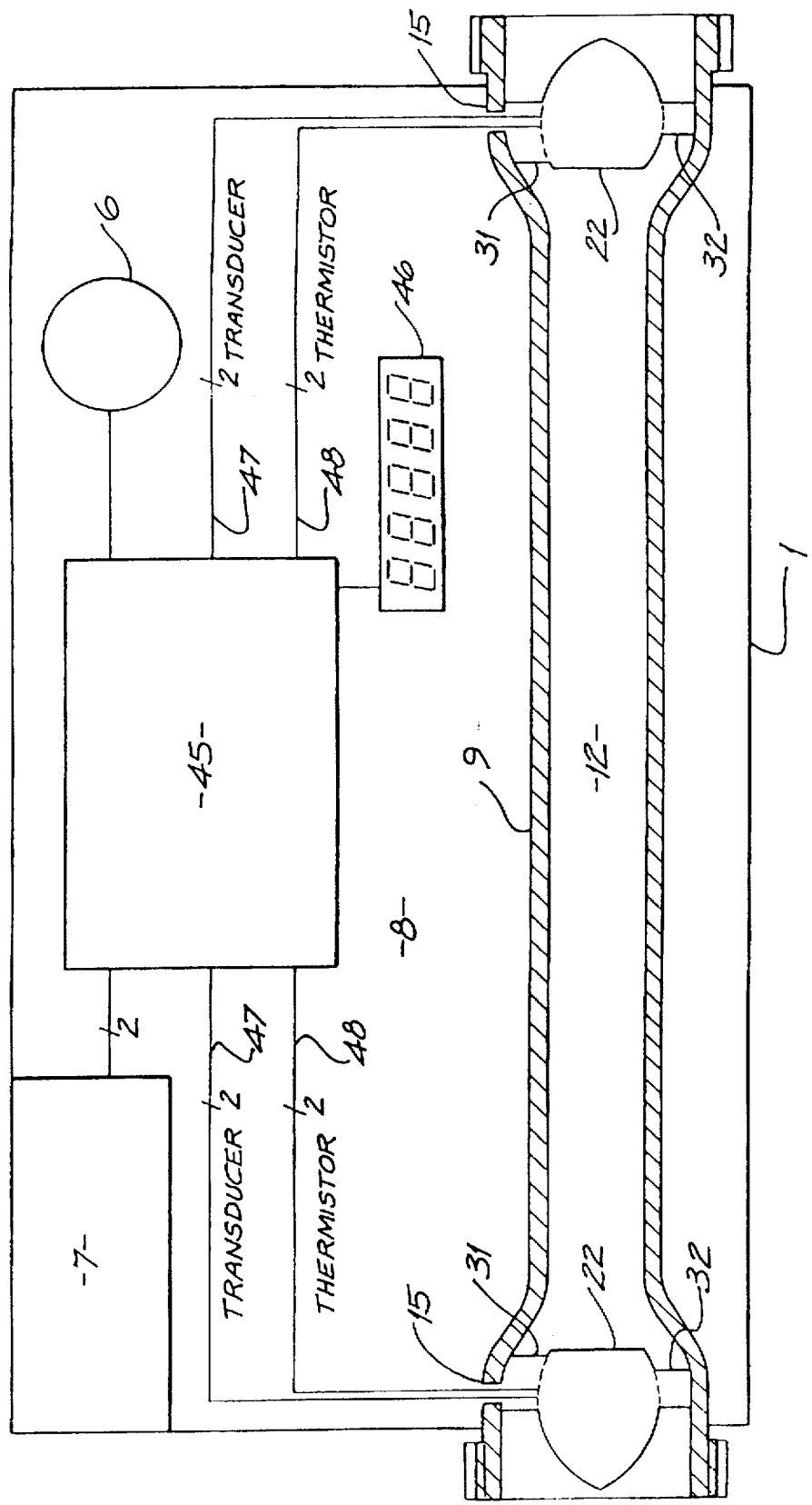
FIG. 16 is a schematic representation of the internal configuration of the gas meter of FIGS. 2 and 3.
Figure 17:
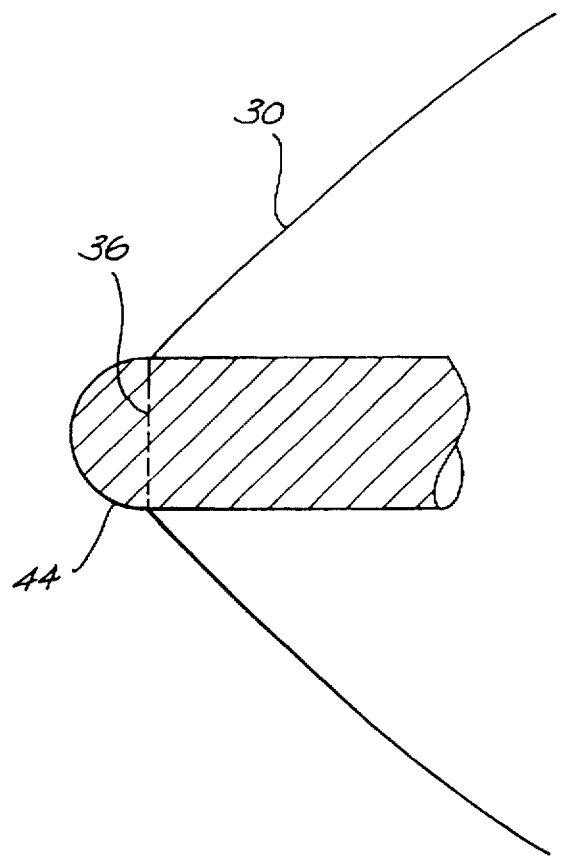
FIG. 17 illustrates the arrangement of a thermometer element in the transducer housing of FIGS. 11 to 15.

Referring now to FIG. 16, the internal interconnection of the gas meter 1 is shown in which each of the transducer housings 22 is arranged such that the main strut 31 aligns with the apertures 15 to permit interconnection with the electronics package 45. In each case, two wires 47 interconnect the electronics package 45 with each of the transducers within the housings 22, and two wires 48 interconnect at least one of the thermometer elements in a similar manner. It will be understood by those skilled in the art that only one thermometer element need be used, located generally in the upstream transducer housing, but in view of the possible alternate arrangement of gas flow through either end of the tube, generally, thermometer elements are arranged in each of the transducer housings 22.

It will be apparent, that in view of the arrangement of the apertures 15 communicating between the measuring tube 9, which is at gas pressure, and the interior void 8 of the meter 1, the void 8 is also at gas pressure. It is for this reason that the battery compartment 7 is configured as a separate compartment In the manner shown in FIGS. 2 and 3 which can be readily accessed without the need to separate the casing base 2 from the casing lid 3. Alternatively, the aperture 15 can be sealed using a known sealant. This permits the changing of batteries within the meter 1 without the danger of gas leaks. Also shown in FIG. 16 are the interconnections of the optical port 6 to the electronics package 45 and a digital display to in a similar manner.

As described in International Patent Application PCT/AU92/00314 mentioned earlier, gas flow measurements can be taken using such a configuration.

The meter 1 permits accurate measurement of gas flow in the range 0–6 m$^3$/hr over the temperature range −10 to +50°

C. At maximum flow, the pressure drop across the meter 1 is less than 125 Pa. Furthermore, the meter 1 has shown greater accuracy and repeatability than prior art meters and has a much higher turn-down ratio. By calculating and displaying measured data digitally, the meter 1 is readily adaptable to remote reading. Furthermore, the overall dimensions of the meter 1 offer size advantages over existing meters.

The foregoing only describes a number of embodiments of the present invention and modifications, obvious to those skilled in the art, can be made thereto without departing from the scope of the present invention.

For example, although the preferred embodiment relates to a gas meter, the same arrangement and variations thereof are directly applicable to liquid flow meters.

INDUSTRIAL APPLICABILITY

The foregoing disclosure is applicable to fluid flow measurements of both liquids and gases and the specific embodiment described is directly applicable to domestic and industrial gas metering.

We claim:

1. A fluid meter comprising:
   a pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area smaller than that of the end openings and the pipeline, there being a transitional portion of non-constant transverse cross-sectional area in each end portion between the respective end opening and the intermediate portion;
   first and second transducer housings each enclosing a respective acoustic transducer, each housing:
   (a) being locatable within the pipe section in respective ones of the end portions to define a measurement portion therebetween;
   (b) being externally fluid dynamically shaped to substantially reduce pressure drop of the fluid as the fluid passes through the measurement portion; and
   (c) having a compartment for housing the respective acoustic transducer, the compartment comprising an acoustic signal transparent window facing towards the window of the other transducer through the intermediate portion thereby permitting signals to be passed between the transducers; and
   a control module electronically connected to the transducers to cause transmission and reception of acoustic signals through the intermediate section between the transducers to determine the velocity of fluid flowing in the intermediate section; and wherein
   in order to reduce acoustic back reflections from the transitional portions to the transducers and to reduce pressure drop along the transitional portions, each of the transducer housings is positioned at least partly within the corresponding one of the transitional portions, which are constructed such that a minimum transverse cross-sectional area about each transducer housing is not less than the transverse cross-sectional area of the intermediate portion.

2. A fluid meter comprising;
   a pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area smaller than that of the end openings and the pipeline, there being a transitional portion of non-constant transverse cross-sectional area in each end portion between the respective end opening and the intermediate portion;
   first and second transducer housings each enclosing a respective acoustic transducer, each housing;
   (a) being locatable within the pipe section in respective ones of the end portions to define a measurement portion therebetween;
   (b) being externally fluid dynamically shaped to substantially reduce pressure drop of the fluid as the fluid passes through the measurement portion; and
   (c) having a compartment for housing the respective acoustic transducer, the compartment comprising an acoustic signal transparent window facing towards the window of the other transducer through the intermediate portion thereby permitting signals to be passed between the transducers; and
   a control module electronically connected to the transducers to cause transmission and reception of acoustic signals through the intermediate section between said transducers to determine the velocity of fluid flowing in the intermediate section; and wherein
   said transitional portions have a profile which, in combination with the respective transducer housing, reduces pressure drop along the pipe section and acoustic back reflections from the transitional portions to the respective transducer: and
   wherein the intermediate portion has an internal radius ($r_i$) smaller than an internal radius ($r_o$) of the end portions to which said pipeline having a corresponding internal radius connects, wherein the internal radius ($r_t$) of each of two transition portions between said radii ($r_i$, $r_o$) in each said end portion substantially corresponds to the equation:

$$r_t = \left( \frac{r_o + r_i}{2} \right) \pm \left( \frac{r_o - r_i}{2} \right) \tanh\left( \frac{\pi \chi}{L} \right)$$

where (L) is half the length of the transition region and ($\chi$) is the distance in millimeters from the centre of the transition.

3. A fluid meter as claimed in claim 2 wherein each of the end portions includes a flared periphery of a radius larger than the radius ($r_o$).

4. A fluid meter comprising:
   pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area smaller than that of the end openings and the pipeline, there being a transitional portion of non-constant transverse cross-sectional area in each end portion between the respective end opening and the intermediate portion;

first and second transducer housings each enclosing a respective acoustic transducer, each housing;
  (a) being locatable within the pipe section in respective ones of the end portions to define a measurement portion therebetween;
  (b) being externally fluid dynamically shaped to substantially reduce pressure drop of the fluid as the fluid passes through the measurement portion; and
  (c) having a compartment for housing the respective acoustic transducer, the compartment comprising an acoustic signal transparent window facing towards the window of the other transducer through the intermediate portion thereby permitting signals to be passed between the transducers; and a control module electronically connected to the transducers to cause transmission and reception of acoustic signals through the intermediate section between said transducers to determine the velocity of fluid flowing in the intermediate section; and wherein said transitional portions have a profile which, in combination with the respective transducer housing, reduces pressure drop along the pipe section and acoustic back reflections from the transitional portions to the respective transducer; and further comprising mode control means configured to control effects of non-fundamental acoustic modes on a signal received by at least one said transducer.

5. A fluid meter as claimed in claim 4 wherein said mode control means comprises at least part of said measurement portion configured with a non-circular transverse cross-section.

6. A fluid meter as claimed in claim 5 wherein said mode control means comprises at least two interconnecting wall portions of the measurement portion, wherein at least one of the wall portions is curved and at least one other is substantially non-curved.

7. A fluid meter as claimed in claim 6 wherein the curved wall portion(s) has a transverse cross-section selected from the group consisting of a partial ellipse, a part circle, a parabola, an hyperbola, a cycloid, a hypocycloid, and an epicycloid, and the substantially non-curved wall portion is flat.

8. A fluid meter as claimed in claim 7 wherein interconnections between the wall portions are integrally formed.

9. A fluid meter as claimed in claim 4 wherein said mode control means comprises at least a part of said measurement portion having a roughened interior fluid confining surface.

10. A fluid meter as claimed in claim 9 wherein said roughened interior surface comprises deviations from a smooth surface of between 0.01 and 8 millimeters.

11. A fluid meter as claimed in claim 4 wherein said mode control means comprises a plurality of straightening vanes arranged within at least a part of said measurement portion.

12. A fluid meter as claimed in claim 11 wherein said straightening vanes comprise a plurality of elongate tubes arranged within said intermediate portion.

13. A fluid meter comprising:

a pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area smaller than that of the end openings and the pipeline, there being a transitional portion of non-constant transverse cross-sectional area in each end portion between the respective end opening and the intermediate portion;

first and second transducer housings each enclosing a respective acoustic transducer, each housing:
  (a) being locatable within the pipe section in respective ones of the end portions to define a measurement portion therebetween:
  (b) being externally fluid dynamically shaped to substantially reduce pressure drop of the fluid as the fluid passes through the measurement portion: and
  (c) having a compartment for housing the respective acoustic transducer, the compartment comprising an acoustic signal transparent window facing towards the window of the other transducer through the intermediate portion thereby permitting signals to be passed between the transducers; and a control module electronically connected to the transducers to cause transmission and reception of acoustic signals through the intermediate section between said transducers to determine the velocity of fluid flowing in the intermediate section; and wherein said transitional portions have a profile which, in combination with the respective transducer housing, reduces pressure drop along the pipe section and acoustic back reflections from the transitional portions to the respective transducer; and further comprising a casing enclosing the control module, the pipe section passing through the casing, and wherein the end portions extend beyond the casing for connection to the pipeline.

14. A fluid meter as claimed in claim 13 wherein said control module is adapted to cause transmission of acoustic signals from said first transducer to said second transducer and vice versa and to determine therefrom a change in the time-of-flight of said signals between said transducers in the respective directions of transmission and thereby calculate the fluid flow velocity within the intermediate section and subsequently the velocity of fluid flow within said pipeline, said control module comprising electronic means configured to control effects of non-fundamental acoustic modes on a signal received by at least one said transducer.

15. A fluid meter as claimed in claim 1 wherein the pressure drop along said pipe section is less than or equal to 125 Pa at a gas flow rate of 6 m³/hour.

16. A fluid meter comprising:

a pipe section adapted for the measurement of fluid flow through a pipeline into which the pipe section is insertable, the pipe section comprising a first and second end portions each having an end opening, and an intermediate portion arranged between the end portions, the pipeline and end openings having substantially the same internal transverse cross-sectional areas, the intermediate portion having an internal transverse cross-sectional area small than that of the end openings and the pipeline, there being a transitional portion of non-constant transverse cross-sectional area in each end portion between the respective end opening and intermediate portion;

first and second transducer housings each enclosing a respective acoustic transducer, each housing:
  (a) being locatable within the pipe section in respective ones of the end portions to define a measurement portion therebetween;
  (b) being externally fluid dynamically shaped to substantially reduce pressure drop of the fluid as the fluid passes through the measurement portion; and (c) having a compartment for housing the respective acoustic transducer, the compartment comprising an acoustic signal transparent window facing towards the window of the other transducer through the intermediate portion thereby permitting signals to be passed between the transducers; and a control module electronically connected to the transducers to cause transmission and reception of acoustic signals through the intermediate section between said transducers to determine the velocity of fluid flowing in the intermediate section; and wherein said transitional portions have a profile which, in combination with the respective transducer housing, reduces pressure drop along the pipe section and acoustic back reflections from the transition portions of the respective transducer; and wherein each said transducer housing is centrally located in the respective one of said end portions, each said transducer housing comprising at least one support bracket integrally formed and extending from a body portion of said housing in which the respective said acoustic transducer is positioned, each said bracket forming a fluid-dynamically shaped strut that acts to minimize the degree of pressure drop of the fluid as it passes over the strut, said at least one bracket enclosing electric connections between the respective said transducer and said control module.

* * * * *

UNITED STATES PATENT AND TRADEMARK OFFICE
CERTIFICATE OF CORRECTION

PATENT NO.    :    5,728,948

DATED         :    March 17, 1998

INVENTOR(S):       Noel Bignell et al

It is hereby certified that error appear(s) in the above-identified patent and that said Letters Patent is hereby corrected as shown below:

Cover page of patent, Col. 1; under [30] Foreign Application Priority Data; "Mar. 9, 1995" should be --March 9, 1993--.

Signed and Sealed this

Eleventh Day of May, 1999

Attest:

Q. TODD DICKINSON

*Attesting Officer*      *Acting Commissioner of Patents and Trademarks*